United States Patent
Tyndall et al.

(10) Patent No.: US 7,505,980 B2
(45) Date of Patent: *Mar. 17, 2009

(54) SYSTEM AND METHOD FOR CONTROLLING ACCESS TO MULTIPLE PHYSICAL MEDIA LIBRARIES

(75) Inventors: John F. Tyndall, Austin, TX (US); William H. Moody, II, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 472 days.

This patent is subject to a terminal disclaimer.

(21) Appl. No.: 10/704,265

(22) Filed: Nov. 7, 2003

(65) Prior Publication Data

US 2004/0139094 A1    Jul. 15, 2004

Related U.S. Application Data

(60) Provisional application No. 60/425,034, filed on Nov. 8, 2002.

(51) Int. Cl.
G06F 7/00 (2006.01)
G06F 17/00 (2006.01)
G06F 12/00 (2006.01)
G06F 13/00 (2006.01)
G06F 13/28 (2006.01)

(52) U.S. Cl. ................... 707/100; 711/161
(58) Field of Classification Search ............. 707/1, 707/10, 100, 200, 201, 204; 711/114, 153, 711/161, 203; 714/114
See application file for complete search history.

(56) References Cited

U.S. PATENT DOCUMENTS

| | | | |
|---|---|---|---|
| 4,104,718 A | 8/1978 | Poublan et al. | |
| 4,430,701 A | 2/1984 | Christian et al. | |
| 4,945,428 A | 7/1990 | Waldo | 360/92 |
| 5,214,768 A | 5/1993 | Martin et al. | 395/425 |
| 5,455,926 A * | 10/1995 | Keele et al. | 711/112 |
| 5,506,986 A * | 4/1996 | Healy | 707/204 |

(Continued)

FOREIGN PATENT DOCUMENTS

EP    1 156 408 A1    11/2001

(Continued)

OTHER PUBLICATIONS

Working Draft NCITS T10 Project 999D, "Information Technology—SCSI-3 Medium Changer Commands (SMC)", pp. 1-68, Mar. 14, 1998.

(Continued)

Primary Examiner—David R Vincent
Assistant Examiner—Benjamin Buss
(74) Attorney, Agent, or Firm—Sprinkle IP Law Group

(57) ABSTRACT

Embodiments of the present invention provide a media library controller that can communicate with multiple physical libraries that are physically separate from each other (i.e., that cannot pass media back and forth). The media library controller can maintain a virtualized aggregate media library representing the physical media libraries with which it is in communication. From the physical media libraries, the media library controller can establish a virtual media library and associate a host with the virtual media library. The virtual media library can represent the portions of a physical media library to which the host is allowed access.

26 Claims, 5 Drawing Sheets

U.S. PATENT DOCUMENTS

| | | | | |
|---|---|---|---|---|
| 5,546,315 | A | 8/1996 | Kleinschnitz | 364/478.06 |
| 5,546,557 | A | 8/1996 | Allen et al. | 395/438 |
| 5,548,521 | A | 8/1996 | Krayer et al. | 364/478.02 |
| 5,568,629 | A | 10/1996 | Gentry et al. | |
| 5,592,638 | A | 1/1997 | Onodera | |
| 5,598,385 | A | 1/1997 | Mizukami et al. | 369/36 |
| 5,612,934 | A | 3/1997 | Dang et al. | 369/36 |
| 5,740,061 | A | 4/1998 | Dewey et al. | 364/478.02 |
| 5,761,503 | A * | 6/1998 | Fisher | 707/104.1 |
| 5,764,615 | A | 6/1998 | Ware et al. | 369/178 |
| 5,790,852 | A | 8/1998 | Salm | |
| 5,870,732 | A * | 2/1999 | Fisher et al. | 707/1 |
| 5,892,633 | A | 4/1999 | Ayres et al. | |
| 5,914,919 | A | 6/1999 | Fosler et al. | 369/34 |
| 5,959,866 | A | 9/1999 | Hanaoka et al. | 364/478.02 |
| 5,963,971 | A * | 10/1999 | Fosler et al. | 711/114 |
| 5,971,281 | A * | 10/1999 | Frary et al. | 235/487 |
| 6,031,798 | A | 2/2000 | James et al. | 369/34 |
| 6,041,329 | A * | 3/2000 | Kishi | 707/100 |
| 6,041,381 | A | 3/2000 | Hoese | |
| 6,044,442 | A * | 3/2000 | Jesionowski | 711/114 |
| 6,052,341 | A * | 4/2000 | Bingham et al. | 711/112 |
| 6,058,494 | A | 5/2000 | Gold et al. | |
| 6,085,123 | A | 7/2000 | Baca et al. | 700/214 |
| 6,185,165 | B1 | 2/2001 | Jesionowski et al. | 369/34 |
| 6,327,519 | B1 | 12/2001 | Ostwald et al. | 700/245 |
| 6,327,594 | B1 * | 12/2001 | Van Huben et al. | 707/200 |
| 6,328,766 | B1 | 12/2001 | Long | |
| 6,336,172 | B1 * | 1/2002 | Day et al. | 711/161 |
| 6,356,803 | B1 | 3/2002 | Goodman et al. | 700/218 |
| 6,360,232 | B1 * | 3/2002 | Brewer et al. | 707/204 |
| 6,374,241 | B1 * | 4/2002 | Lamburt et al. | 707/6 |
| 6,385,706 | B1 * | 5/2002 | Ofek et al. | 711/162 |
| 6,425,035 | B2 | 7/2002 | Hoese et al. | |
| 6,425,059 | B1 | 7/2002 | Basham et al. | |
| 6,480,934 | B1 | 11/2002 | Hino et al. | |
| 6,487,561 | B1 * | 11/2002 | Ofek et al. | 707/204 |
| 6,493,721 | B1 * | 12/2002 | Getchius et al. | 707/104.1 |
| 6,507,883 | B1 * | 1/2003 | Bello et al. | 711/111 |
| 6,507,889 | B1 | 1/2003 | Tsurumaki et al. | |
| 6,574,641 | B1 | 6/2003 | Dawson et al. | |
| 6,604,165 | B1 | 8/2003 | Terao | |
| 6,665,786 | B2 | 12/2003 | McMichael et al. | |
| 6,675,260 | B2 * | 1/2004 | Torrey et al. | 711/114 |
| 6,715,031 | B2 | 3/2004 | Camble et al. | |
| 6,725,352 | B2 | 4/2004 | Goodman et al. | |
| 6,725,394 | B1 | 4/2004 | Bolt | |
| 6,738,885 | B1 | 5/2004 | Zhang et al. | |
| 6,763,419 | B2 | 7/2004 | Hoese et al. | |
| 6,772,231 | B2 | 8/2004 | Reuter et al. | |
| 6,804,753 | B1 | 10/2004 | Moody, II et al. | |
| 6,839,824 | B2 * | 1/2005 | Camble et al. | 711/173 |
| 6,845,431 | B2 * | 1/2005 | Camble et al. | 711/152 |
| 6,950,723 | B2 | 9/2005 | Gallo et al. | |
| 7,136,988 | B2 | 11/2006 | Gallo | |
| 7,199,809 | B1 * | 4/2007 | Lacy et al. | 702/19 |
| 2001/0020197 | A1 | 9/2001 | Nakano et al. | |
| 2002/0004883 | A1 * | 1/2002 | Nguyen et al. | 711/111 |
| 2002/0019863 | A1 | 2/2002 | Reuter et al. | |
| 2002/0144048 | A1 | 10/2002 | Bolt | |
| 2002/0169521 | A1 | 11/2002 | Goodman et al. | |
| 2002/0188592 | A1 * | 12/2002 | Leonhardt et al. | 707/1 |
| 2002/0199077 | A1 | 12/2002 | Goodman et al. | |
| 2003/0014585 | A1 | 1/2003 | Ji | |
| 2003/0070053 | A1 | 4/2003 | Gallo et al. | |
| 2003/0084240 | A1 | 5/2003 | Torrey et al. | |
| 2003/0126360 | A1 | 7/2003 | Camble et al. | |
| 2003/0126361 | A1 | 7/2003 | Slater et al. | |
| 2003/0126362 | A1 | 7/2003 | Camble et al. | |
| 2003/0126395 | A1 | 7/2003 | Camble et al. | |
| 2003/0126396 | A1 | 7/2003 | Camble et al. | |
| 2003/0126460 | A1 | 7/2003 | Camble et al. | |
| 2003/0131157 | A1 | 7/2003 | Hoese et al. | |
| 2003/0131253 | A1 * | 7/2003 | Martin et al. | 713/200 |
| 2003/0135580 | A1 * | 7/2003 | Camble et al. | 709/216 |
| 2003/0212873 | A1 | 11/2003 | Lee et al. | |
| 2003/0221054 | A1 | 11/2003 | Wu | |
| 2004/0044828 | A1 * | 3/2004 | Gibble et al. | 711/4 |
| 2004/0044871 | A1 | 3/2004 | Weber et al. | |
| 2004/0054838 | A1 | 3/2004 | Hoese et al. | |
| 2004/0064641 | A1 | 4/2004 | Kodama | |
| 2004/0088513 | A1 | 5/2004 | Biessener et al. | |
| 2004/0107300 | A1 | 6/2004 | Padmanabhan et al. | |
| 2004/0111580 | A1 | 6/2004 | Weber et al. | |
| 2004/0133915 | A1 * | 7/2004 | Moody et al. | 725/86 |
| 2004/0139094 | A1 | 7/2004 | Tyndall et al. | |
| 2004/0139240 | A1 | 7/2004 | DiCorpo et al. | |
| 2004/0139260 | A1 | 7/2004 | Steinmetz et al. | |
| 2004/0148460 | A1 | 7/2004 | Steinmetz et al. | |
| 2004/0148461 | A1 | 7/2004 | Steinmetz et al. | |
| 2006/0069844 | A1 | 3/2006 | Gallo et al. | |
| 2006/0149919 | A1 | 7/2006 | Arizpe et al. | |

FOREIGN PATENT DOCUMENTS

| | | |
|---|---|---|
| WO | WO 02/27463 A2 | 4/2002 |
| WO | WO03/104971 A1 | 12/2003 |

OTHER PUBLICATIONS

Working Draft INCITS T10 Project 1383D, "Information Technology—SCSI Media Changer Commands-2 (SMC-2)", pp. i-x and 1-58, Nov. 18, 2003.

International Search Report for PCT/US 03/35824, Dec. 6, 2004.

International Search Report for PCT/US 03/35822, Dec. 6, 2004.

U.S. Patent Office Official Action issued in U.S. Appl. No. 11/046,019, Justiss et al., May 9, 2007.

CNET Glossary: Terms for the techie: controller, [online] pp. 1-2, Retrieved from the Internet: <URL:http://www.cnet.com/4520-6029_1-6040342-1.html?tag=txt retrieved on Jul. 27, 2007, source 2007 CNET Networks, Inc.

CNET Glossary: Terms for the techie: crawler, [online] pp. 1-2, from Retrieved from the Internet: <URL:http://www.cnet.com/4520-6029_1-6040387-1.html ,retrieved on Jul. 27, 2007, source 2007 CNET Networks, Inc.

Griswold, Robert, "Storage Topologies", [online] pp. 56-63, 0018-9162, Retrieved from the Internet: <URL:http://www.crossroads.com/Library/CollateralDownloads.asp retrieved on Jul. 27, 2007, source Crossroads Systems, Inc., Dec. 2002.

SGI—OpenVault Glossary of Terms, [online] pp. 1-8, Retrieved from the Internet: <URL:http://www.sgi.com/products/software/openvault/glossary/html retrieved on Jul. 27, 2007, 1993-2007, source SGI.

Tape Solutions: Router vs. Native Fibre Channel, Crossroads White Paper, pp. 1-7, Document Version #001, Crossroads Systems, Inc., Apr. 29, 2002.

U.S. Patent Office Official Action issued Jul. 5, 2007 in U.S. Appl. No. 11/046,066, Justiss et al., Jul. 5, 2007.

U.S. Patent Office Official Action issued Jun. 28, 2007 in U.S. Appl. No. 11/045,443, Justiss et al., Jun. 28, 2007.

Office Action issued in U.S. Appl. No. 11/046,019 dated Jan. 28, 2008.

Office Action issued in U.S. Appl. No. 10/880,360 dated Aug. 29, 2007.

Office Action issued in U.S. Appl. No. 11/046,019 dated Jul. 23, 2008.

* cited by examiner

SYSTEM AND METHOD FOR CONTROLLING ACCESS TO MULTIPLE PHYSICAL MEDIA LIBRARIES

RELATED APPLICATIONS

This Application claims priority under 35 U.S.C. §119(e) to U.S. Provisional Patent Application No. 60/425,034, entitled "A Method for Presenting a Single Logical Media Library Robotics Controller While Actually Operating Multiple Physical Media Library Robotics Controllers in an Aggregated Media Library Environment," filed Nov. 8, 2002, by inventors John Tyndall, William Moody, and Robert Sims the contents of which are fully incorporated by reference herein.

TECHNICAL FIELD OF THE INVENTION

The present invention relates to accessing media libraries. More particularly, the present invention relates systems and methods of providing access to multiple physical media libraries.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router), the tape libraries may be further addressed by bus number.

In current tape library systems, each tape library presents itself as an independent entity on the network. Each host in these systems maintains a view (i.e., a table of target numbers, LUNs and element numbers) of each of the tape libraries. Using this address information a host can format commands to the tape library to perform read/write, backup and other operations. In order to coordinate activities, hosts must cooperate with each other in issuing these commands. Enabling cooperation, however, requires reconfiguration of the hosts each time a new media library is added to the SAN. Moreover, to prevent conflicts between hosts, each host must typically use the same application to access a shared tape library. This can be inefficient as individual tape libraries cannot store data from multiple applications.

Prior art media libraries suffer additional shortcomings including lack of scalability. Currently, when an entity's need for storage outgrows the capabilities of its media library, the entity must, in many cases, purchase an additional independent media library. Because the independent media libraries present themselves as independent entities on a network, there is typically no single point of control for the libraries. Each host on the network will have access to each media library, often leading to conflicts. One solution to this problem is an expandable media library in which physical units can be combined. In these systems, the robots which control the physical movement of media within a particular library can communicate with robots in connected libraries to transfer media such that the multiple libraries act as a single library. The use of multiple robots can allow some backup operations to continue even if one robot is offline. These systems, however, are often very expensive and require a large amount of space in single location so that the libraries can be connected together. Additionally, the entity installing such a system must have enough foresight to initially install a media library that is capable of expanding in this manner.

Another, more cost effective solution, is a set of modular media libraries that use a single robot. In these systems, each library installed after the initial library does not have its own robot, but, instead, is designed to stack on the initial library so that the robot from the initial library can move between the libraries. In essence, the libraries are combined into a single library using one robot. Again, however, this solution requires enough space in a single location and sufficient foresight on part of the installing entity to purchase a media library configured to allowing stacking. As a further deficiency, if the single robot experiences problems, the entity may not be able to perform any backup operations at all.

SUMMARY OF THE INVENTION

Embodiments of the present invention provide a system and method of media library access that eliminates, or at least substantially reduces, the shortcomings of prior art media library access systems and methods. More particularly, embodiments of the present invention provide a media library controller that can communicate with multiple physical libraries that are physically separate from each other (i.e., that cannot pass media back and forth). The media library controller can maintain a virtualized aggregate media library representing the physical media libraries with which it is in communication. From the physical media libraries, the media library controller can establish a virtual media library and associate a host with the virtual media library. The virtual media library can represent the portions of a physical media library to which the host is allowed access. The media library-controller can receive a data operation command from the host and determine if the data operation command corresponds to a portion of the physical media library to which the host has access. If so, the media library controller can forward the data operation command to the appropriate physical robot and/or drives. Otherwise, the media library controller can reject the data operation command.

In another embodiment of the present invention, the media library controller can present the virtual media library to the host such that the host sees a media library with a virtual drive, virtual robot and virtual slots (i.e., the host will see a virtual robotic controller and virtual slots). The host can then formulate data operation commands based on the virtual media library (e.g., based on the addressing information seen by the host). When the media library controller receives the command, the media library controller can forward the command to the robot and/or drives at the physical media library to which the host has access based on a mapping of the virtual drive(s), virtual robot(s) and virtual slots to physical drives, robots and slots.

Another embodiment of the present invention can include a set of computer instructions executable by a computer processor to communicate with at least a first physical media library and a second physical media library, wherein said first physical media library and said second physical media library are physically separate. The computer instructions can also be executable to maintain a virtualized aggregate media library representing at least the first physical media library and the second physical media library and associate a first host with a virtual media library that represents at least a portion of the first physical media library to which the host has access. In this manner, the computer instructions can be executable to control the access of a host to multiple media libraries.

Yet another embodiment of the present invention can include a method of aggregating multiple media libraries that comprises: (i) associating a host with a virtual media library, wherein the virtual media library represents the portion of a physical media library to which the host has access; (ii) receiving a data operation command from a host; (iii) determining whether the received command is directed to the portion of the physical media library which is accessible by the host; and (iv) if the command is directed to the portion of the physical media library which is accessible by the host, forwarding the received command to the robots and/or drives at the physical media library accessible by the host. In one embodiment of the present invention, the command can be changed during forwarding to account for the mapping between virtual drives, robots and slots and physical drives, robots and slots.

The present invention provides an advantage over prior art systems and methods of aggregating media libraries by providing a single point of control for multiple media libraries without requiring that the media libraries be preconfigured to connect with existing media libraries. This can substantially reduce the complexity and cost of expanding data storage abilities.

Embodiments of the present invention provide another advantage over prior art systems of aggregating media libraries by allowing hosts running different applications to share media libraries. Because multiple hosts can share the same physical media libraries, data can be stored more efficiently. Moreover, because access can be controlled at a central point, the hosts do not have to be extensively reconfigured to allow sharing without conflict.

In addition, embodiments of the present invention provide another advantage over prior art systems by allowing a central control point to be established for media libraries that may reside at different locations. This can reduce the amount of space required at a single location for expanding media libraries.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for providing a central point of control for multiple, physically separate media libraries. By providing a central point of control, embodiments of the present invention can eliminate, or substantially reduce, conflicts between multiple hosts attempting to access the same media libraries. In the preferred embodiment, a plurality of hosts are connected to multiple tape libraries via a fibre channel storage area network ("SAN"). Each tape library includes one or more tape drives to perform read/write operations and slots to store tape cartridges and utilizes a robot to load individual tape cartridges into the tape drives. A media library controller is connected to the SAN between the hosts and the media libraries and acts as a central control point for the libraries. The controller maintains a virtualized aggregate media library representing each of the media libraries behind the controller. The controller can also maintain a set of virtual media libraries with each virtual media library representing a portion of a single physical media library behind the controller. By associating each host with a virtual media library such that the host can only have access to certain portions of the physical media library, the media library controller can reduce conflicts between the hosts.

Figure 1:
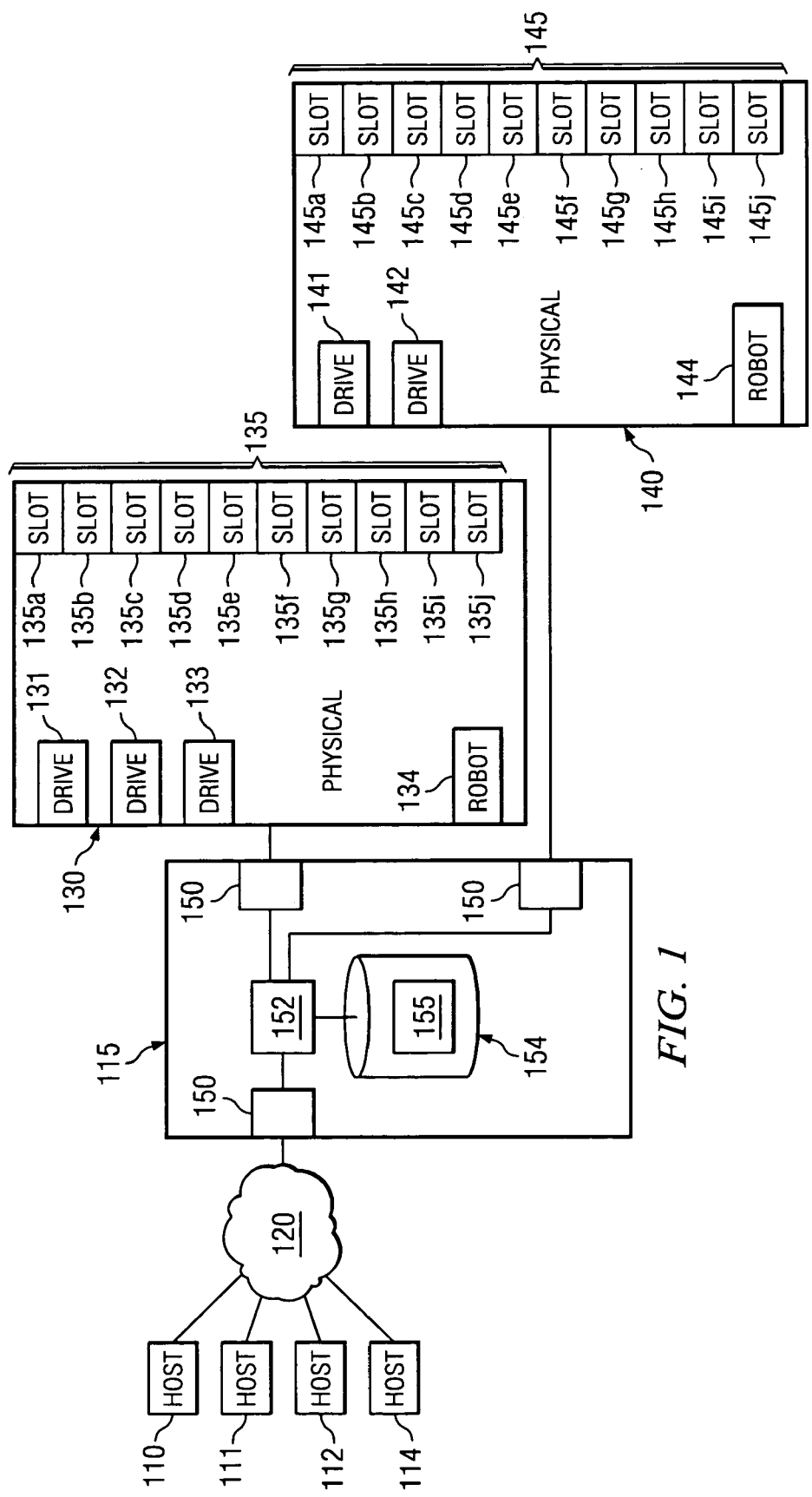
FIG. 1 is a diagrammatic representation of a system in which a plurality of hosts have access to multiple media libraries on a network according to one embodiment of the present invention.

FIG. 1 is a diagrammatic representation of a system 100 in which a plurality of hosts have access to multiple media libraries on a network. In this embodiment, hosts 110, 111, 112 and 114 are coupled to a media library controller 115 via network 120. The media library controller controls access to media libraries 130 and 140. In the preferred embodiment, network 120 is a fibre channel SAN and media libraries 130 and 140 connect to media library controller 115 by either fibre channel or SCSI connections. Network 120, in other embodiments of the present invention, can comprise the Internet, a LAN, a WAN, a wireless network or any other communications network known in the art. Similarly, media libraries 130 and 140 can communicate with media library controller 115 over any suitable communications link or network known in the art and can use additional protocols such as iSCSI, TCP/IP, or other protocol known in the art.

Media library 130 and media library 140, in the preferred embodiment of the present invention, comprise tape libraries, though, in other embodiments, the media libraries can comprise any media library known in the art such as optical jukeboxes. A tape library, as would be understood by one of ordinary skill in the art, typically consists of one or more tape drives that can read/write data from/to magnetic tape (contained within cartridges), eject tape cartridges and perform other operations. A series of slots stores the magnetic tape cartridges when they are not in a drive and a robot moves the magnetic tape cartridges between the drives and slots. As an example, media library 130 can comprise drives 131-133, robot 134 and slots 135 (individually slots 135*a-j*) while media library 140 can comprise drives 141-142, robot 144 and slots 145 (individually slots 145*a-j*). Media libraries 130 and 140, in the preferred embodiment, are physically separate from each other. That is, even if media libraries 130 and 140 are in physical contact with each other, they can not pass tape cartridges back and forth. It should be noted that a media library that employs a single robot or multiple robots in an expandable or modular configuration, but presents itself as a single media library to a network can be considered a single media library for the purposes of this application.

Media library controller 115 can comprise one or more communications interfaces (e.g., fibre channel interface, Ethernet port or other communications interface known in the art) to connect media library controller 115 to SAN 120 and media libraries 130 and 140. Additionally, media library controller 115 can comprise a computer processor 152 and a computer readable memory 154 (e.g., RAM, ROM, magnetic disk, optical disk and/or any other computer readable memory known in the art) that can store computer instructions 155, which are executable by processor 152. Computer instructions 155 can be implemented as hardware, software, firmware or in any other suitable manner as would be understood by those of ordinary skill in the art.

It should be understood that media library controller 115 can be implemented in a variety manners. For example, when implemented in a SAN, the media library controller can be part of a fibre channel-to-SCSI router, part of a media library to which other media libraries are connected or at any other location in the command flow path.

In operation, computer instructions 155 can be executable such that media library controller 115 can maintain a virtualized aggregate media library representing the drives, slots and robots available at physical media libraries 130 and 140. Additionally, media library controller 115 can associate each host with a virtual media library that represents the robots, drives and slots on a particular physical media library accessible by the associated host. In one embodiment of the present invention, a host will only see the robots, drives and slots that it is authorized to access. When a host issues a data operation command (e.g., read/write) referencing a virtual drive and slot in a virtual media library, media library controller 115 can determine if the command references a portion of physical media library to which the host has access and, if so, forward the command to the corresponding physical drive and robot. To forward the command, media library controller 115 can, if necessary, translate the command received from the host into a format usable by the physical robot to find particular tape cartridges.

Figure 2:
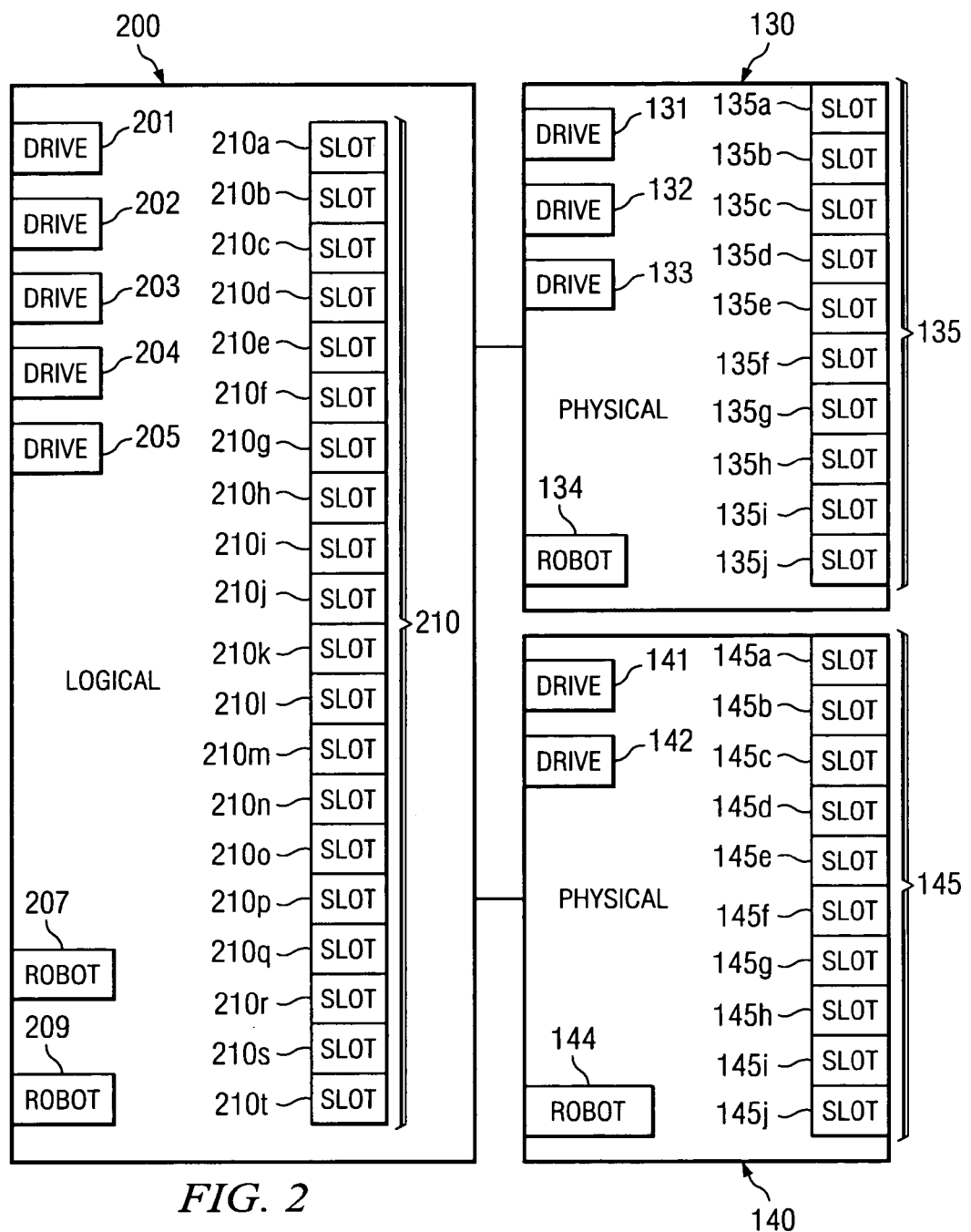
FIG. 2 is a diagrammatic representation of the physical to logical conversion of drives and slots from multiple physical media libraries to a virtualized aggregate media library at a media library controller according to one embodiment of the present invention.

FIG. 2 is a diagrammatic representation of the physical to logical conversion of drives and slots from multiple physical media libraries to a virtualized aggregate media library at a media library controller. In the embodiment of FIG. 2, a media library controller (e.g., media library controller 115 of FIG. 1) can map the drives and slots of physical media libraries 130 and 140 to virtualized aggregate media library 200.

In one embodiment of the present invention, a media library controller can contain a map of physical drives 131, 132, 133, 141 and 142, represented by logical drives 201-205, and a map of physical slots 135*a-j* and 145*a-j*, represented by logical slots 210*a* through 210*t*. Additionally, the media library controller can map robots 134 and 144, represented by logical robots 207 and 209, respectively. Virtualized aggregate media library 200, thus, represents the media library controller's view of the separate physical libraries that may have duplicate addresses for drives and robots.

If tape libraries 130 and 140 are SCSI tape libraries, for example, the media library controller can maintain virtualized aggregate media library 200 as a table of the target numbers and LUNs for physical drives and physical robots and a table of element numbers for the slots and drives at each physical media library. Table 1 is an example of a table that can be maintained by the media library controller as its "view" of the connected physical libraries. It should be noted that this table is provided by way of example only. It should be further noted that the data in table 1 can be maintained as one table, multiple tables (e.g., an address and element number table) as a file, as a database, or in any other format known in the art.

TABLE 1

| SCSI BUS | Target | LUN | Element Number | Corresponding Physical Drive/Slot/Robot |
|---|---|---|---|---|
| 1 | 1 | 0 | 3 | drive 131 |
| 2 | 1 | 0 | 3 | drive 141 |
| 1 | | | 4 | slot 135a |
| 1 | | | 5 | slot 135b |
| 2 | | | 4 | slot 145a |
| 2 | | | 5 | slot 145b |
| 1 | 1 | 4 | | robot 134 |
| 2 | 1 | 0 | | robot 144 |

By maintaining a mapping of targets, LUNs and element numbers, the media library controller can maintain an aggregate view of the tape libraries which it controls. The addressing information contained in Table 1 is provided by way of example only and any addressing information sufficient to forward commands from the media library controller to the connected media libraries can be used to maintain virtualized aggregate media library 200.

Figure 3:
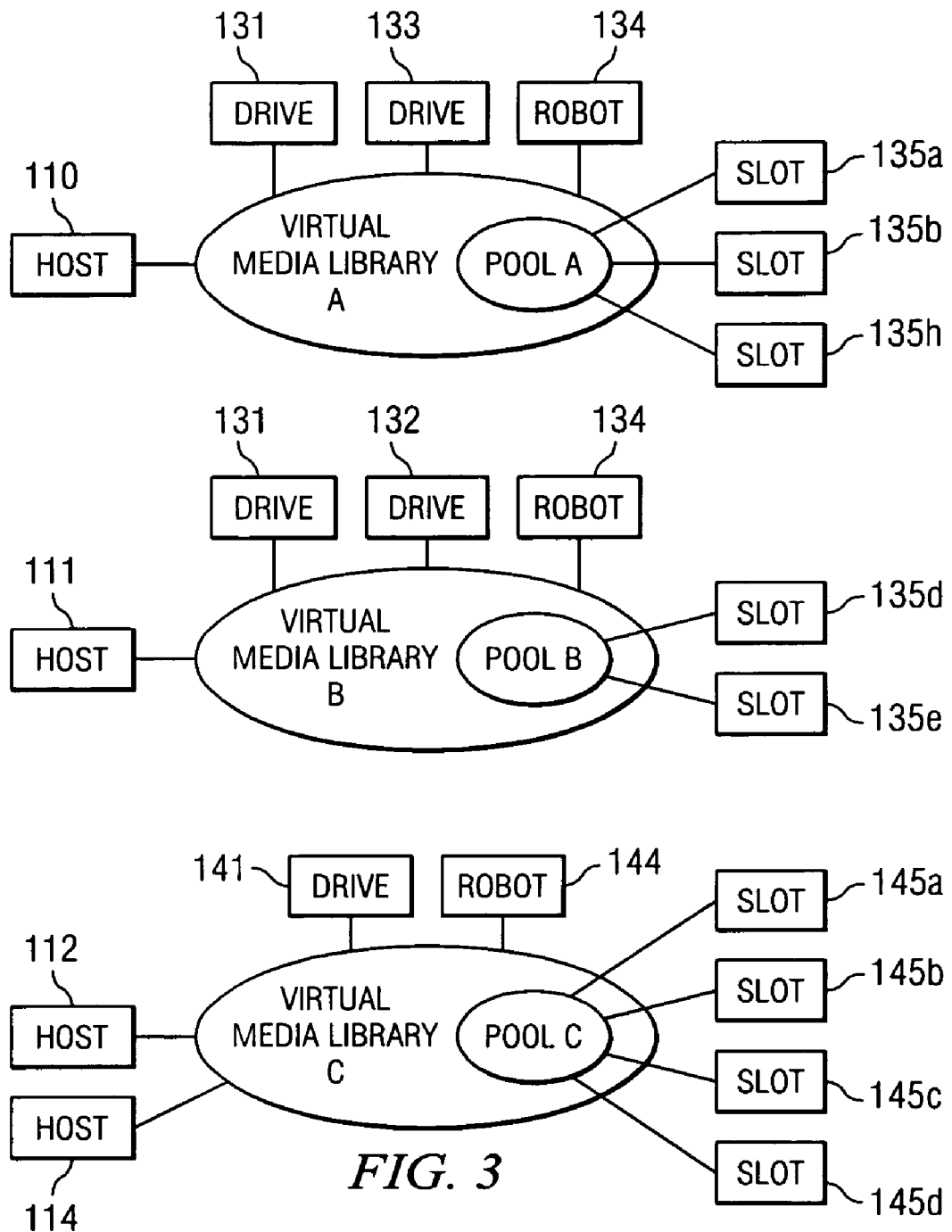
FIG. 3 is a diagrammatic representation illustrating the association of hosts, robots, drives and cartridge slots with particular virtual media libraries according to one embodiment of the present invention.

In addition to establishing a virtualized aggregate media library 200, the media library controller can associate hosts with virtual media libraries. Each virtual media library represents the robots, drives and cartridge slots accessible by an associated host. FIG. 3 is a diagrammatic representation illustrating the association of hosts, robots, drives and cartridge slots with particular virtual media libraries according to one embodiment of the present invention. It can be seen from this figure that drive 131, drive 133 and robot 134 are assigned to virtual media library A. Additionally, a pool of slots (e.g., slots 135*a*, 135*b* and 135*h*) is assigned to virtual media library A. Because host 110 is also assigned to Virtual Media Library A, host 110 can issue commands to drives 131 and 133 and robot 134 to affect the tape cartridges in slots 135a, 135b and 135h. Similarly, because host 111 is associated with Virtual Media Library B, host 111 can access slots 135d-e (i.e., slot Pool B) and use drive 131 and drive 132 and robot 134. In the third example, two hosts are associated with Virtual Library C. This can occur, for example, when the hosts are running applications that can coordinate backup activities. Because host 112 and 114 are associated with Virtual Library C, each issue commands to drive 141 and robot 144 to manipulate the tape cartridges in physical slots 145a-d.

As shown in FIG. 3, each virtual library can contain the drives, slots and robots that can be accessed by a particular host. Because the physical media libraries are physically separate (i.e., they can not pass tape cartridges back and forth), a single virtual media library will contain only drives, slots and robots corresponding to a single physical media library. To wit, Virtual Media Libraries A and B contain only drives, slots and the robot from physical media library 130 of FIG. 1 while Virtual Media Library C contains only drives, slots and the robot from physical media library 140 of FIG. 1. Each virtual media library, therefore, represents at least a portion of a single physical media library. An exemplary method of partitioning the slots in a physical media library into pools is described in U.S. patent application Ser. No. 10/065,329, entitled "Partitioned Library," to Moody et al., which is hereby fully incorporated by reference herein.

The slots discussed above are each included in only one of the pools and, hence, only one of the virtual media libraries. The drives and robots, however, may be shared by multiple virtual media libraries so long as the virtual media libraries represent portions of the same physical media library. In order to avoid conflicts between hosts concurrently accessing the same drive or robot, the media library controller can establish access rules such as first come first served, giving priority to particular hosts or other such rules. In other embodiments of the present invention, there may be overlap between the slot pools. For instance, some slots may be shared as import/export slots that allow tape cartridges to be transferred between pools. Overlapping pools, however, are drawn from the same physical media library as tape cartridges can not be passed from one physical media library to another as the physical media libraries are physically separate.

By associating hosts with virtual media libraries, a media library controller can filter out tape access commands that affect drives, robots or slots not associated with a particular host. For instance, if host 110 attempts to access the tape cartridge in slot 135d, the media library controller can recognize that the target slot is not in the slot pool of Virtual Media Library A and can reject the command. Rejection of unauthorized commands can be handled in various manners, such as discarding the command without notification to the host, returning an error message or in another manner.

A Media library controller can also control access to each host in a variety of other ways, such through the access control method described in U.S. Pat. No. 5,941,972 entitled "Storage Router and Method for Providing Virtual Local Storage," to Hoese, which is hereby fully incorporated by reference herein. In another embodiment of the present invention, access can be controlled by presenting the hosts with virtual drives, robots and slots and mapping the virtual robots, drives and slots to physical drives, robots and slots. In this embodiment, the hosts do not see drives, robots or slots that they are not allowed to access, but only see the virtual drives, robots and/or slots in the virtual media library with which they are associated. Rather than simply filtering commands, the media library controller can thus act as a virtualization layer between the physical media libraries and the hosts.

Figure 4:
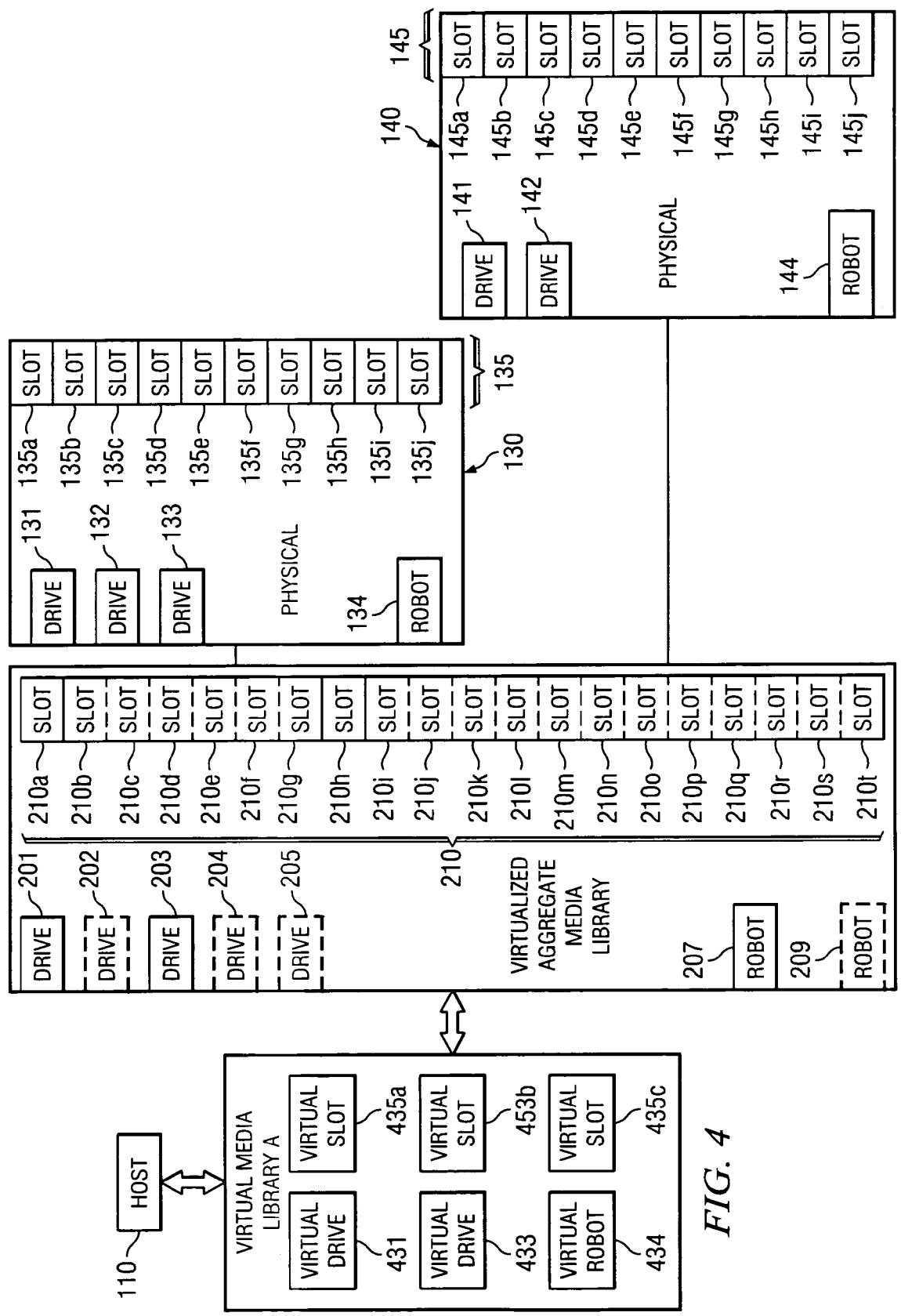
FIG. 4 is a diagrammatic representation illustrating the conversion of a physical robots, drives and slots to virtual robots, drives and slots that can be seen by a host in accordance with one embodiment of the present invention.

FIG. 4 is a diagrammatic representation illustrating the conversion of physical robots, drives and slots to virtual robots, drives and slots that can be seen by a host in accordance with one embodiment of the present invention. In FIG. 4, the example of Virtual Media Library A from FIG. 3 is used. The robot, drives and slots of Virtual Media Library A can be assigned any target numbers, LUNs and element numbers by a media library controller to map the physical robot, drives and slots to virtual counterparts. Thus, physical drive 131 can be represented by virtual drive 431, physical drive 133 can be represented by virtual drive 433, physical robot 143 can be represented by virtual robot 434 and physical slots 135a, 135b and 135h can be represented by virtual slots 435a-c. As would be understood by those of ordinary skill in the art, the virtual media library can thus be presented as virtual tape drives, a virtual robotic controller (i.e., can be presented with information showing a virtual robot with access to virtual drives) and virtual slots. Media library controller 115 can maintain a mapping of the virtual drives, robots and slots to the corresponding physical drives, robots and slots.

Table 2 is an example of a mapping between physical drives, robots and slots and virtual counterparts for Virtual Media Library A according to one embodiment of the present invention. It should be noted that this table is provided by way of example only. It should be further noted that the mappings of Table 2 can be maintained as one table, multiple tables (e.g., an address and element number table) as a file, as a database, or in any other format known in the art.

TABLE 2

| Virtual | | | | Physical | | | | Corresponding |
| --- | --- | --- | --- | --- | --- | --- | --- | --- |
| Virtual SCSI Bus | Virtual Target | Virtual LUN | Virtual Element Number | Physical SCSI BUS | Physical Target | Physical LUN | Physical Element Number | Physical Drive/Slot/Robot |
| 1 | 1 | 1 | 4 | 1 | 1 | 0 | 3 | drive 131 |
| 1 | 2 | 2 | 5 | 1 | 2 | 1 | 8 | drive 133 |
| 1 | | | 1 | 1 | | | 4 | slot 135a |
| 1 | | | 2 | 1 | | | 5 | slot 135b |
| 1 | | | 3 | 1 | | | 7 | slot 135h |
| 1 | 2 | 3 | | 1 | 1 | 4 | | robot 134 |

The virtual attributes of Table 2 can represent those seen by host 110 (i.e., as presented by a media controller) while the physical attributes can represent the media controller's view of the attached physical media libraries. Thus, for example, host 110 may see physical robot 134 as being at LUN 3, whereas the physical robot may actually be at LUN 4. When host 110 issues commands referencing physical robot 134, the command can be directed to the virtual attributes presented by the media controller. In other words, the commands can be based on host 110's view that robot 134 is at LUN 4. The media library controller can map the command to robot 134 and forward the command to the robot.

It should be noted that forwarding of the command may include changing the command. For example, if host 110 issues a command for robot 134 to place the tape cartridge from slot 135a in drive 131, host 110 can issue the command based on the virtual attributes with which it is presented. The media controller, upon receipt of the command may have to change the command to, for example, reference the proper element numbers for physical drive 131 and physical slot 135a. Thus, the command received from host 110, which can reference virtual element number 4 for drive 131 and virtual element number 1 for slot 135a, can be changed to reference physical element number 1 for drive 131 and physical element number 4 for slot 135a.

As can be noted from Table 2, the physical and virtual counterparts do not have to share the same target number, LUNs and/or element numbers. Thus, slot 435c, which represents physical slot 135h, can be assigned a different element number, for example, than that assigned to physical slot 135h. Host 110 could therefore see physical slot number 8 (i.e., slot 135h) of media library 130 as slot number 3. Because any address attributes can be assigned to a virtual drive, robot or slot, media library controller 115 can similarly configure a virtual slot presented to host 111 as slot number 3. Thus, host 111 may also see physical slot number 4 (i.e., slot 135d) as virtual slot number 3. Different hosts may thereby access what is seen by each as the same cartridge slot, when in reality, each host is accessing a different cartridge slot (assuming the hosts are associated with different pools).

Furthermore, as can be seen in FIG. 4, the virtual media library does not have to correspond to an entire physical media library, but may represent a subset or portion of the physical media library. If a new host is associated with Virtual Media Library A, that host will see the same virtual drives, robots and slots as host 110 and will, consequently, have access to the same portion of physical media library 130 as host 110.

Figure 5:
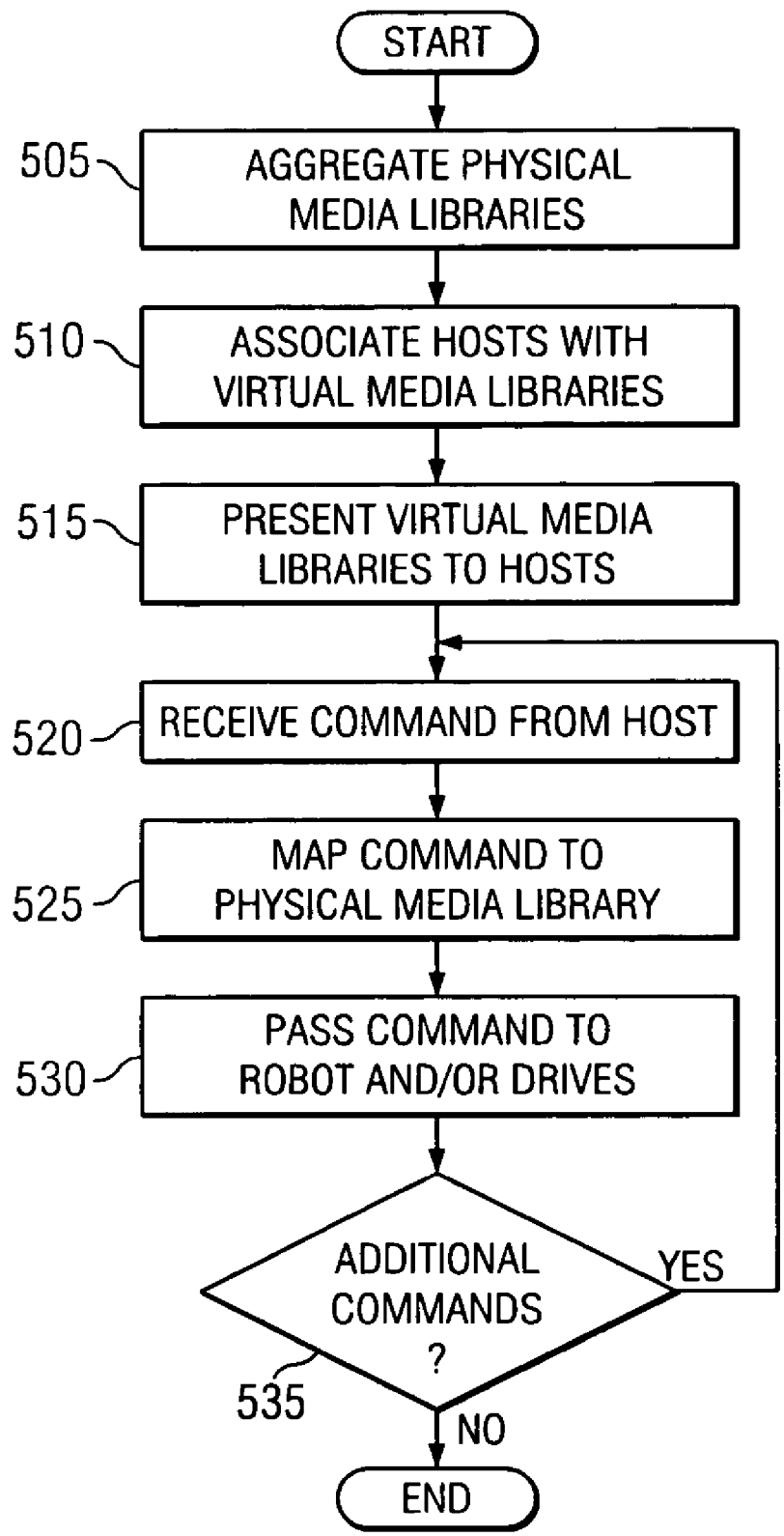
FIG. 5 is a flow diagram illustrating a method for controlling access to multiple media libraries according to one embodiment of the present invention.

FIG. 5 is a flow diagram representing one embodiment of a method for controlling access to multiple physical media libraries. At step 505, a media library controller can establish a virtualized aggregate media library. This can be done, for example, by querying media libraries connected to media library controller 115, gathering information from a management information database, performing device discovery, receiving input from a systems administrator or in any other manner known in the art. The virtualized aggregate media library can include the information necessary to address commands to the attached media libraries. In the case of a SCSI environment this information can include bus numbers, target numbers, element numbers, LUNs or any other information needed to address commands to a particular physical media library. If the physical media libraries are fibre channel based, the virtualized aggregate media library can also contain information such as native fibre channel addressing information. As would be understood by one of ordinary skill in the art, the particular contents of the virtualized aggregate media library can depend on the protocol used to communicate with physical media libraries and the information needed to forward coherent commands to the physical media libraries.

At step 510, the media library controller can associate hosts with virtual media libraries. Each virtual library can represent the portions of the physical media library to which the associated host has access. In the case of tape libraries, the virtual libraries can include the robots, drives and cartridge slots to which a host has access. The cartridge slots can be associated in pools with a particular host, each cartridge slot in a pool coming from a single physical host. In one embodiment of the present invention, the pools will not overlap. Thus, only hosts associated with a particular virtual media library will be able access a particular cartridge slot. In other embodiments of the present invention, the pools can overlap to provide, for example, import/export slots so that tape cartridges can be passed between pools. Each virtual media library can be associated with zero, one or multiple hosts.

In one embodiment of the present invention, the virtual media libraries can represent filtering rules. In this embodiment, each host can still see drives, robots and slots with which is not associated. But, if the host issues a command that affects a drive, robot or slot with which it is not associated, media library controller 115 will reject the command. In the embodiment shown in FIG. 5, on the other hand, the media library controller can, at step 515, present the virtual media libraries to the hosts so that each host can see the virtual media library with which it is associated. To present a virtual media library, the media library controller can map the attributes of the physical media libraries to virtual media libraries and present the virtual counterparts to the hosts.

In the case of a tape library, for example, the media library controller can map the physical drives, slots and robots to virtual drives, slots and robots that can, but do not necessarily, exhibit the same address attributes as the physical drive. When a host looks for available tape libraries on the network, the media library controller will present the virtual tape library to the host as a tape library available to that host. As the host will "see" a virtual robot and virtual drives, the host will in essence see a virtual robotic controller with access to virtual tape cartridges. The host can then format data operation commands based on the virtual media library with which it is presented.

At step 520, the media library controller can receive a data operation command from a host. Because the host sees the virtual drives, robots and slots presented to it by the media library controller (i.e., sees a virtual robotic controller, virtual drives and virtual slots), the command will be addressed to the virtual robots and drives and will reference the virtual slots. The media library controller, at step 525, can route the commands to the physical drives and robots according to the mapping between the virtual media library and the physical media library. Additionally at step 525, the media library controller can perform a translation, if necessary, to convert the command received from the host into a command usable by the physical robot to locate the correct tape cartridge. At step 530, the media library controller can pass the command to the appropriate physical media library so that the physical media library can carry out the data operation command initiated by the host. It should be noted that in passing the command to the physical robots and drives, the media library controller can change the command to account for the mapping between virtual attributes and physical attributes. For each additional data operation command, the media controller can repeat steps 520-530. The media controller can also optionally repeat the entire process of FIG. 5.

The media library controller provides a central point of control for multiple, physically separate media libraries. By providing a central point of control, embodiments of the present invention can eliminate or substantially reduce conflicts between multiple hosts attempting to access the same media libraries. In the preferred embodiment, a plurality of hosts are connected to multiple tape libraries via a fibre channel storage area network ("SAN"). Each tape library includes one or more tape drives to perform read/write operations and slots to store tape cartridges and utilizes a robot to load individual tape cartridges into the tape drives. The media library controller is connected to the SAN between the hosts and the media libraries and acts as a central control point for the libraries. The media library controller maintains a virtualized aggregate view of the physical media libraries to which it is connected and creates a set of virtual libraries that represent partitions of the physical libraries. Hosts can be associated with the virtual libraries so that each host can only access the portions of the physical media libraries with which it is associated.

Although described as a separate unit in the embodiment of FIG. 1, the media library controller can be implemented at various spots in the command flow path, including at a fibre channel-to-SCSI router or at one of the physical media libraries. In these embodiments, memory and processing can be shared with other components. Embodiments of the present invention can also be implemented with respect to libraries of media other than magnetic tapes. For example, the media library can comprise a plurality of optical disks (i.e., an optical jukebox) or removable hard drives. The media library can contain any type of information, including but not limited to raw data, audio and video. Furthermore, the media library controller can include an interface for the administration and management of the device.

Embodiments of the present invention provide advantages over prior art systems of managing media libraries by allowing multiple separate media libraries to be aggregated at a single point of control. Because the media libraries are independent, each will have its own robot or robots. This can allow backup operations to continue even if one of the media libraries experiences problems. The advantages of a multiple robot media library can thereby be achieved through the use of less expensive independent media libraries. Additionally, because embodiments of the present invention can partition multiple media libraries at a central control point, hosts running different applications can share portions of the same group of media libraries without conflict and without extensive reprogramming.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A controller for aggregating multiple physically separate media libraries, said controller comprising:
   a computer processor;
   a computer memory electronically connected to the computer processor, the computer memory storing a set of computer instructions executable by the computer processor to:
      maintain a virtualized aggregate media library representing a plurality of physical media libraries including a first physical media library and a second physical media library, wherein a physical media library comprises computer-readable media and one or more drives for performing operations on said computer-readable media;
      communicate with at least the first physical media library and the second physical media library, wherein said first physical media library and said second physical media library are physically separate;
      associate a first virtual media library with a first host, wherein the first virtual media library represents a first portion of the first physical media library to which the first host has access wherein the first portion of the first physical media library comprises at least two non-contiguous slots;
      associate a second virtual media library with a second host, wherein the second virtual library represents a second portion of the first physical media library to which the second host has access wherein the first virtual media library and the second virtual media library are non-overlapping;
      store the associations between the first host and the second host and the first virtual media library and the second virtual media library, wherein the associations control access to the first portion of the first physical library represented by said first virtual media library and to the second portion of the first physical library represented by the second virtual media library, wherein the first host is allowed access to the first virtual media library and is not allowed access to the second virtual media library and wherein the second host is allowed access to the second virtual media library and is not allowed access to the first virtual media library; and
      present said first virtual media library to at least one of said first and second hosts.

2. The controller of claim 1, wherein the computer instructions are further executable to:
   determine if a received command from a first host is directed to a portion of the first physical media library with which the first host is associated through the first virtual media library;
   if the received command is directed to a portion of the first physical media library with which the first host is associated through the first virtual media library, forward the received command to the first physical media library;
   if the received command is not directed to a portion of the first physical media library with which the first host is associated through the first virtual media library, reject the received command.

3. The controller of claim 1, wherein the computer instructions are further executable to:
   receive a command from a host to perform a data operation corresponding to the first virtual media library:
   map the command to the first physical media library; and
   forward the command to the first physical media library.

4. The controller of claim 1, wherein the computer instructions are executable to present the first virtual media library by presenting a virtual drive, a virtual robot and a plurality of virtual slots to the one or more hosts.

5. The controller of claim 1, wherein the computer instructions are further executable to associate a plurality of virtual media libraries to a plurality of hosts, wherein each virtual media library corresponds to one physical media library.

6. The controller of claim 5, wherein each virtual media library comprises a pool of slots corresponding to physical slots.

7. The controller of claim 6, wherein the plurality of virtual media libraries comprise non-overlapping pools.

8. The controller of claim 1, wherein the computer instructions are further executable to present a single virtual media library to multiple hosts.

9. The controller of claim 1, wherein said computer instructions are further executable to map the first physical media library and the second physical media library to the virtualized aggregate media library.

10. A system for providing access to multiple physically separate media libraries comprising computer instructions stored on a computer readable memory, executable to:
    maintain a virtualized aggregate media library representing a plurality of physical media libraries including a first physical media library and a second physical media library, wherein a physical media library comprises computer-readable media and one or more drives for performing operations on said computer-readable media;
    communicate with at least the first physical media library and the second physical media library, wherein said first physical media library and said second physical media library are physically separate;
    associate a first virtual media library with a first host, wherein the first virtual media library represents a first portion of the first physical media library to which the first host has access wherein the first portion of the first physical media library comprises at least two non-contiguous slots;
    associate a second virtual media library with a second host, wherein the second virtual library represents a second portion of the first physical media library to which the second host has access wherein the first virtual media library and the second virtual media library are non-overlapping;
    store the associations between the first host and the second host and the first virtual media library and the second virtual media library, wherein the associations control access to the first portion of the first physical library represented by said first virtual media library and to the second portion of the first physical library represented by the second virtual media library, wherein the first host is allowed access to the first virtual media library and is not allowed access to the second virtual media library and wherein the second host is allowed access to the second virtual media library and is not allowed access to the first virtual media library; and
    present said first virtual media library to at least one of said first and second hosts.

11. The system of claim 10, wherein the computer instructions are further executable to:
    determine if a received command from a first host is directed to a portion of the first physical media library with which the first host is associated through the first virtual media library;
    if the received command is directed to a portion of the first physical media library with which the first host is associated through the first virtual media library, forward the received command to the first physical media library;
    if the received command is not directed to a portion of the first physical media library with which the first host is associated through the first virtual media library, reject the received command.

12. The system of claim 10, wherein the computer instructions are further executable to:
    receive a command from a host to perform a data operation corresponding to the first virtual media library;
    map the command to the first physical media library; and
    forward the command to the first physical media library.

13. The system of claim 10, wherein the computer instructions are executable to present the first virtual media library by presenting a virtual drive, a virtual robot and a plurality of virtual slots to the one or more hosts.

14. The system of claim 10, wherein the computer instructions are further executable to associate a plurality of virtual media libraries to a plurality of hosts, wherein each virtual media library corresponds to a portion of one physical media library.

15. The system of claim 14, wherein each virtual media library includes a pool of slots corresponding to physical slots.

16. The system of claim 15, wherein the plurality of virtual media libraries comprise non-overlapping pools.

17. The system of claim 10, wherein the computer instructions are further executable to map present a single virtual media library to multiple hosts.

18. The system of claim 10, wherein said computer instructions are further executable to map the first physical media library and the second physical media library to a the virtualized aggregate media library.

19. A method of aggregating multiple media libraries comprising:
    maintaining a virtualized aggregate media library representing a plurality of physical media libraries wherein said physical media libraries are physically separate and wherein each physical media library of the plurality of physical media libraries comprises computer-readable media and one or more drives for performing operations on said computer-readable media;
    communicating with the plurality of physically separate media libraries;
    associating a first virtual media library with a first host, wherein the first virtual media library represents a first portion of a physical media library to which the first host has access and wherein the association of the first virtual media library with the first host controls access to the first portion of the physical library represented by said first virtual media library wherein the first portion of the physical media library comprises at least two non-contiguous slots;
    associating a second virtual media library with a second host, wherein the second virtual media library represents a second portion of the physical media library to which the second host has access, wherein the first portion of the physical media library and the second portion of the physical media library are non-overlapping, wherein the association of the second virtual media library with the second host controls access to the second portion of the physical library represented by said second virtual media library wherein the second portion of the physical media library comprises at least two non-contiguous slots, the first host is allowed access to the first virtual media library and is not allowed access to the second virtual media library, and the second host is allowed access to the second virtual media library and is not allowed access to the first virtual media library;
    presenting at least one of said first and second virtual media libraries to at least one of said first and second hosts;
    receiving a data operation command from the first host;
    determining whether the received command is directed to the first portion of the physical media library represented by the first virtual media library with which the first host is associated;
    if the command is directed to the first portion of the physical media library which is accessible by the first host, forwarding the received command to the physical media library accessible by the first host; and if the command is directed to the second portion of the physical media library, rejecting the command.

20. The method of claim 19, wherein associating a virtual media library with a host further comprises associating the host with at least one drive, at least one robot and a pool of slots at a single physical media library.

21. The method of claim 20, wherein said pool of slots is non overlapping.

22. The method of claim 21, further comprising presenting the first virtual media library to the hosts as a virtual drive, a virtual robot and pool of virtual slots.

23. The method of claim 22, further comprising mapping said first virtual drive to a physical drive, mapping said virtual robot to a physical robot and mapping said virtual slots to physical slots.

24. A controller for aggregating multiple physically separate media libraries, said controller comprising:

a computer processor;

a computer memory electronically connected to the computer processor, the computer memory storing a set of computer instructions executable by the computer processor to:

maintain a mapping between physical drives, robots and slots at the physically separate media libraries to virtual drives, robots and slots;

associate a first host with a first virtual media library, wherein the first virtual media library represents a first portion of the first physical media library and wherein the association of the first virtual media library with the first host controls access to the first portion of the first physical library represented by said first virtual media library wherein the first portion of the first physical media library comprises at least two non-contiguous slots;

associate a second host with a second virtual media library, wherein the second virtual media library represents a second portion of the first physical media library, the association of the second virtual media library with the second host controls access to the a second portion of the first physical library represented by said second virtual media library, wherein the second portion of the first physical media library comprises at least two non-contiguous slots, the first host is allowed access to the first virtual media library and is not allowed access to the second virtual media library and the second host is allowed access to the second virtual media library and is not allowed access to the first virtual media library;

present the first virtual media library comprising one or more of the virtual drives, one or more of the virtual robots and one or more of the virtual slots to the first host;

receive a command from the first host based on the first virtual media library; and transform the command according to the mapping for forwarding to the appropriate physical media library.

25. The controller of claim 24, wherein the first virtual media library comprises a first pool of virtual slots that maps to a first set of physical slots for storing tape cartridges at a first physical media library and the second virtual media library comprises a second pool of virtual slots that map to a second set of physical slots for storing tape cartridges at the first physical media library, wherein the first set of physical slots and the second set of physical slots do not overlap.

26. The controller of claim 24, wherein the set of computer instructions are further executable to present the second virtual media library to the second host and not to the first host and to not present the first virtual media library to the second host.

* * * * *